(12) United States Patent
Gass et al.

(10) Patent No.: US 7,421,315 B2
(45) Date of Patent: Sep. 2, 2008

(54) DETECTION SYSTEM FOR POWER EQUIPMENT

(75) Inventors: Stephen F. Gass, Wilsonville, OR (US); J. David Fulmer, Tualatin, OR (US)

(73) Assignee: SD3, LLC, Tualatin, OR (US)

(*) Notice: Subject to any disclaimer, the term of this patent is extended or adjusted under 35 U.S.C. 154(b) by 0 days.

(21) Appl. No.: 11/487,717

(22) Filed: Jul. 17, 2006

(65) Prior Publication Data

US 2006/0254401 A1 Nov. 16, 2006

Related U.S. Application Data

(63) Continuation of application No. 10/292,607, filed on Nov. 12, 2002, now Pat. No. 7,077,039.

(60) Provisional application No. 60/335,970, filed on Nov. 13, 2001.

(51) Int. Cl.
*G05B 19/18* (2006.01)
*B26D 5/00* (2006.01)

(52) U.S. Cl. ............... 700/253; 192/125 R; 192/129 R; 83/62; 83/63; 83/76.1; 83/76.8; 83/DIG. 1

(58) Field of Classification Search ............... 83/DIG. 1, 83/13, 58, 76.1, 370, 477.2, 62, 63, 72, 76.6–76.9; 340/660, 686.6; 192/125 R, 129 R, 116.5; 342/109–112; 318/362; 700/253, 255
See application file for complete search history.

(56) References Cited

U.S. PATENT DOCUMENTS

| 146,886 A | 1/1874 | Doane et al. |
|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |

(Continued)

FOREIGN PATENT DOCUMENTS

CA 2140991 1/1995

(Continued)

OTHER PUBLICATIONS

Skil Model 3400-Type 1 10" Table Saw Parts List and Technical Bulletin, S-B Power Tool Company, Jun. 1993.

(Continued)

*Primary Examiner*—Jason Prone (57) ABSTRACT

A machine is disclosed having a detection subsystem adapted to detect contact between a person and a specified portion of the machine, and to distinguish that contact from contact with other materials. The detection subsystem imparts an electrical signal to a specified portion of the machine, and distinguishes that contact based on a predetermined frequency response of the electrical signal. A reaction subsystem then causes a predetermined action to take place. The machine may be a power saw designed to minimize injury in the event a person accidentally contacts the blade.

20 Claims, 7 Drawing Sheets

U.S. PATENT DOCUMENTS

| | | |
|---|---|---|
| 982,312 A | 1/1911 | Swafford |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,492,145 A | 4/1924 | Talley |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 6/1926 | Sorlien |
| 1,616,478 A | 2/1927 | Watson |
| 1,640,517 A | 8/1927 | Procknow |
| 1,662,372 A | 3/1928 | Ward |
| 1,668,061 A | 5/1928 | Falkins |
| 1,701,948 A | 2/1929 | Crowe |
| 1,711,490 A | 5/1929 | Dummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Dummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 2/1948 | McWhirter et al. |
| 2,466,325 A | 4/1949 | Ocenasek |
| 2,496,613 A | 2/1950 | Wooward |
| 2,501,134 A | 3/1950 | Meckoski et al. |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,719,547 A | 10/1955 | Gjerde |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,804,890 A | 9/1957 | Fink |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,937,672 A | 5/1960 | Gjerde |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |

| | | | | | |
|---|---|---|---|---|---|
| 3,105,530 A | 10/1963 | Peterson | 3,960,310 A | 6/1976 | Nussbaum |
| 3,129,731 A | 4/1964 | Tyrrell | 3,967,161 A | 6/1976 | Lichtblau |
| 3,163,732 A | 12/1964 | Abbott | 3,974,565 A | 8/1976 | Ellis |
| 3,184,001 A | 5/1965 | Reinsch et al. | 3,975,600 A | 8/1976 | Marston |
| 3,186,256 A | 6/1965 | Reznick | 3,978,624 A | 9/1976 | Merkel et al. |
| 3,207,273 A | 9/1965 | Jurin | 3,994,192 A | 11/1976 | Faig |
| 3,213,731 A | 10/1965 | Renard | 4,007,679 A | 2/1977 | Edwards |
| 3,224,474 A | 12/1965 | Bloom | 4,016,490 A | 4/1977 | Weckenmann et al. |
| 3,232,326 A | 2/1966 | Speer et al. | 4,026,174 A | 5/1977 | Fierro |
| 3,246,205 A | 4/1966 | Miller | 4,026,177 A | 5/1977 | Lokey |
| 3,249,134 A | 5/1966 | Vogl et al. | 4,029,159 A | 6/1977 | Nymann |
| 3,274,876 A | 9/1966 | Debus | 4,047,156 A | 9/1977 | Atkins |
| 3,276,497 A | 10/1966 | Heer | 4,048,886 A | 9/1977 | Zettler |
| 3,306,149 A | 2/1967 | John | 4,060,160 A | 11/1977 | Lieber |
| 3,313,185 A | 4/1967 | Drake et al. | 4,070,940 A | 1/1978 | McDaniel et al. |
| 3,315,715 A | 4/1967 | Mytinger | 4,075,961 A | 2/1978 | Harris |
| 3,323,814 A | 6/1967 | Phillips | 4,077,161 A | 3/1978 | Wyle et al. |
| 3,337,008 A | 8/1967 | Trachte | 4,085,303 A | 4/1978 | McIntyre et al. |
| 3,356,111 A | 12/1967 | Mitchell | 4,090,345 A | 5/1978 | Harkness |
| 3,368,596 A | 2/1968 | Comer | 4,091,698 A | 5/1978 | Obear et al. |
| 3,386,322 A | 6/1968 | Stone et al. | 4,106,378 A | 8/1978 | Kaiser |
| 3,439,183 A | 4/1969 | Hurst, Jr. | 4,117,752 A | 10/1978 | Yoneda |
| 3,445,835 A | 5/1969 | Fudaley | 4,145,940 A | 3/1979 | Woloveke et al. |
| 3,454,286 A | 7/1969 | Anderson et al. | 4,152,833 A | 5/1979 | Phillips |
| 3,456,696 A | 7/1969 | Gregory et al. | 4,161,649 A | 7/1979 | Klos et al. |
| 3,512,440 A | 5/1970 | Frydmann | 4,175,452 A | 11/1979 | Idel |
| 3,538,964 A | 11/1970 | Warrick et al. | 4,184,394 A | 1/1980 | Gjerde |
| 3,540,338 A | 11/1970 | McEwan et al. | 4,190,000 A | 2/1980 | Shaull et al. |
| 3,554,067 A | 1/1971 | Scutella | 4,195,722 A | 4/1980 | Anderson et al. |
| 3,566,996 A | 3/1971 | Crossman | 4,199,930 A | 4/1980 | Lebet et al. |
| 3,580,376 A | 5/1971 | Loshbough | 4,206,666 A | 6/1980 | Ashton |
| 3,581,784 A | 6/1971 | Warrick | 4,206,910 A | 6/1980 | Biesemeyer |
| 3,593,266 A | 7/1971 | Van Sickle | 4,249,117 A | 2/1981 | Leukhardt et al. |
| 3,613,748 A | 10/1971 | De Pue | 4,249,442 A | 2/1981 | Fittery |
| 3,621,894 A | 11/1971 | Niksich | 4,262,278 A | 4/1981 | Howard et al. |
| 3,670,788 A | 6/1972 | Pollak et al. | 4,267,914 A | 5/1981 | Saar |
| 3,675,444 A | 7/1972 | Whipple | 4,270,427 A | 6/1981 | Colberg et al. |
| 3,680,609 A | 8/1972 | Menge | 4,276,459 A | 6/1981 | Willett et al. |
| 3,688,815 A | 9/1972 | Ridenour | 4,276,799 A | 7/1981 | Muehling |
| 3,695,116 A | 10/1972 | Baur | 4,291,794 A | 9/1981 | Bauer |
| 3,696,844 A | 10/1972 | Bernatschek | 4,305,442 A | 12/1981 | Currie |
| 3,716,113 A | 2/1973 | Kobayashi et al. | 4,319,146 A | 3/1982 | Wires, Sr. |
| 3,719,103 A | 3/1973 | Streander | 4,321,841 A | 3/1982 | Felix |
| 3,740,000 A | 6/1973 | Takada | 4,334,450 A | 6/1982 | Benuzzi |
| 3,745,546 A | 7/1973 | Struger et al. | 4,372,202 A | 2/1983 | Cameron |
| 3,749,933 A | 7/1973 | Davidson | 4,374,552 A | 2/1983 | Dayen |
| 3,754,493 A | 8/1973 | Niehaus et al. | 4,385,539 A | 5/1983 | Meyerhoefer et al. |
| 3,772,590 A | 11/1973 | Mikulecky et al. | 4,391,358 A | 7/1983 | Haeger |
| 3,785,230 A | 1/1974 | Lokey | 4,418,597 A | 12/1983 | Krusemark et al. |
| 3,793,915 A | 2/1974 | Huier | 4,427,042 A | 1/1984 | Mitchell et al. |
| 3,805,639 A | 4/1974 | Peter | 4,466,170 A | 8/1984 | Davis |
| 3,805,658 A | 4/1974 | Scott et al. | 4,466,233 A | 8/1984 | Thesman |
| 3,808,932 A | 5/1974 | Russell | 4,470,046 A | 9/1984 | Betsill |
| 3,829,850 A | 8/1974 | Guetersloh | 4,492,291 A | 1/1985 | Chometon et al. |
| 3,829,970 A | 8/1974 | Anderson | 4,503,739 A | 3/1985 | Konieczka |
| 3,858,095 A | 12/1974 | Friemann et al. | 4,510,489 A | 4/1985 | Anderson, III et al. |
| 3,861,016 A | 1/1975 | Johnson et al. | 4,512,224 A | 4/1985 | Terauchi |
| 3,863,208 A | 1/1975 | Balban | 4,518,043 A | 5/1985 | Anderson et al. |
| 3,874,747 A | 4/1975 | Case et al. | 4,532,501 A | 7/1985 | Hoffman |
| 3,880,032 A | 4/1975 | Green | 4,532,844 A | 8/1985 | Chang et al. |
| 3,882,744 A | 5/1975 | McCarroll | 4,557,168 A | 12/1985 | Tokiwa |
| 3,886,413 A | 5/1975 | Dow et al. | 4,559,858 A | 12/1985 | Laskowski et al. |
| 3,889,567 A | 6/1975 | Sato et al. | 4,560,033 A | 12/1985 | DeWoody et al. |
| 3,905,263 A | 9/1975 | Smith | 4,566,512 A | 1/1986 | Wilson |
| 3,922,785 A | 12/1975 | Fushiya | 4,573,556 A | 3/1986 | Andreasson |
| 3,924,688 A | 12/1975 | Cooper et al. | 4,576,073 A | 3/1986 | Stinson |
| 3,931,727 A | 1/1976 | Luenser | 4,589,047 A | 5/1986 | Gaus et al. |
| 3,935,777 A | 2/1976 | Bassett | 4,589,860 A | 5/1986 | Brandenstein et al. |
| 3,945,286 A | 3/1976 | Smith | 4,599,597 A | 7/1986 | Rotbart |
| 3,946,631 A | 3/1976 | Malm | 4,599,927 A | 7/1986 | Eccardt et al. |
| 3,947,734 A | 3/1976 | Flyer | 4,606,251 A | 8/1986 | Boileau |
| 3,949,636 A | 4/1976 | Ball et al. | 4,615,247 A | 10/1986 | Berkeley |
| 3,953,770 A | 4/1976 | Hayashi | 4,621,300 A | 11/1986 | Summerer |

| | | | | | |
|---|---|---|---|---|---|
| 4,625,604 A | 12/1986 | Handler et al. | 5,377,554 A | 1/1995 | Reulein et al. |
| 4,637,188 A | 1/1987 | Crothers | 5,377,571 A | 1/1995 | Josephs |
| 4,637,289 A | 1/1987 | Ramsden | 5,392,568 A | 2/1995 | Howard, Jr. et al. |
| 4,644,832 A | 2/1987 | Smith | 5,392,678 A | 2/1995 | Sasaki et al. |
| 4,653,189 A | 3/1987 | Andreasson | 5,401,928 A | 3/1995 | Kelley |
| 4,657,428 A | 4/1987 | Wiley | 5,411,221 A | 5/1995 | Collins et al. |
| 4,661,797 A | 4/1987 | Schmall | 5,423,232 A | 6/1995 | Miller et al. |
| 4,672,500 A | 6/1987 | Tholome et al. | 5,436,613 A | 7/1995 | Ghosh et al. |
| 4,675,664 A | 6/1987 | Cloutier et al. | 5,447,085 A | 9/1995 | Gochnauer |
| 4,679,719 A | 7/1987 | Kramer | 5,451,750 A | 9/1995 | An |
| 4,718,229 A | 1/1988 | Riley | 5,453,903 A | 9/1995 | Chow |
| 4,722,021 A | 1/1988 | Hornung et al. | 5,471,888 A | 12/1995 | McCormick |
| 4,751,603 A | 6/1988 | Kwan | 5,480,009 A | 1/1996 | Wieland et al. |
| 4,756,220 A | 7/1988 | Olsen et al. | 5,503,059 A | 4/1996 | Pacholok |
| 4,757,881 A | 7/1988 | Jonsson et al. | 5,510,587 A | 4/1996 | Reiter |
| 4,774,866 A | 10/1988 | Dehari et al. | 5,510,685 A | 4/1996 | Grasselli |
| 4,792,965 A | 12/1988 | Morgan | 5,513,548 A | 5/1996 | Garuglieri |
| 4,805,504 A | 2/1989 | Fushiya et al. | 5,531,147 A | 7/1996 | Serban |
| 4,831,279 A | 5/1989 | Ingraham | 5,534,836 A | 7/1996 | Schenkel et al. |
| 4,840,135 A | 6/1989 | Yamauchi | 5,572,916 A | 11/1996 | Takano |
| 4,845,476 A | 7/1989 | Rangeard et al. | 5,587,618 A | 12/1996 | Hathaway |
| 4,864,455 A | 9/1989 | Shimomura et al. | 5,592,353 A | 1/1997 | Shinohara et al. |
| 4,875,398 A | 10/1989 | Taylor et al. | 5,606,889 A | 3/1997 | Bielinski et al. |
| 4,888,869 A | 12/1989 | Leatherman | 5,619,896 A | 4/1997 | Chen |
| 4,896,607 A | 1/1990 | Hall et al. | 5,623,860 A | 4/1997 | Schoene et al. |
| 4,906,962 A | 3/1990 | Duimstra | 5,647,258 A | 7/1997 | Brazell et al. |
| 4,907,679 A | 3/1990 | Menke | 5,648,644 A | 7/1997 | Nagel |
| 4,934,233 A | 6/1990 | Brundage et al. | 5,659,454 A | 8/1997 | Vermesse |
| 4,936,876 A | 6/1990 | Reyes | 5,667,152 A | 9/1997 | Mooring |
| 4,937,554 A | 6/1990 | Herman | 5,671,633 A | 9/1997 | Wagner |
| 4,962,685 A | 10/1990 | Hagstrom | 5,695,306 A | 12/1997 | Nygren, Jr. |
| 4,964,450 A | 10/1990 | Hughes et al. | 5,700,165 A | 12/1997 | Harris et al. |
| 4,965,909 A | 10/1990 | McCullough et al. | 5,720,213 A | 2/1998 | Sberveglieri |
| 4,975,798 A | 12/1990 | Edwards et al. | 5,722,308 A | 3/1998 | Ceroll et al. |
| 5,020,406 A | 6/1991 | Sasaki et al. | 5,724,875 A | 3/1998 | Meredith et al. |
| 5,025,175 A | 6/1991 | Dubois, III | 5,730,165 A | 3/1998 | Philipp |
| 5,042,348 A | 8/1991 | Brundage et al. | 5,741,048 A | 4/1998 | Eccleston |
| 5,046,426 A | 9/1991 | Julien et al. | 5,755,148 A | 5/1998 | Stumpf et al. |
| 5,052,255 A | 10/1991 | Gaines | 5,771,742 A | 6/1998 | Bokaie et al. |
| 5,074,047 A | 12/1991 | King | 5,782,001 A | 7/1998 | Gray |
| 5,081,406 A | 1/1992 | Hughes et al. | 5,787,779 A | 8/1998 | Garuglieri |
| 5,082,316 A | 1/1992 | Wardlaw | 5,791,057 A | 8/1998 | Nakamura et al. |
| 5,083,973 A | 1/1992 | Townsend | 5,791,223 A | 8/1998 | Lanzer |
| 5,086,890 A | 2/1992 | Turczyn et al. | 5,791,224 A | 8/1998 | Suzuki et al. |
| 5,094,000 A | 3/1992 | Becht et al. | 5,791,441 A | 8/1998 | Matos et al. |
| 5,116,249 A | 5/1992 | Shiotani et al. | 5,797,307 A | 8/1998 | Horton |
| 5,119,555 A | 6/1992 | Johnson | 5,819,619 A | 10/1998 | Miller et al. |
| 5,122,091 A | 6/1992 | Townsend | 5,819,625 A | 10/1998 | Sberveglieri |
| 5,146,714 A | 9/1992 | Liiber | 5,852,951 A | 12/1998 | Santi |
| 5,174,349 A | 12/1992 | Svetlik et al. | 5,857,507 A | 1/1999 | Puzio et al. |
| 5,184,534 A | 2/1993 | Lee | 5,861,809 A | 1/1999 | Eckstein et al. |
| 5,198,702 A | 3/1993 | McCullough et al. | 5,875,698 A | 3/1999 | Ceroll et al. |
| 5,199,343 A | 4/1993 | OBanion | 5,880,954 A | 3/1999 | Thomson et al. |
| 5,201,110 A | 4/1993 | Bane | 5,921,367 A | 7/1999 | Kashioka et al. |
| 5,201,684 A | 4/1993 | DeBois, III | 5,927,857 A | 7/1999 | Ceroll et al. |
| 5,206,625 A | 4/1993 | Davis | 5,930,096 A | 7/1999 | Kim |
| 5,207,253 A | 5/1993 | Hoshino et al. | 5,937,720 A | 8/1999 | Itzov |
| 5,212,621 A | 5/1993 | Panter | 5,942,975 A | 8/1999 | Sorensen |
| 5,218,189 A | 6/1993 | Hutchison | 5,943,932 A | 8/1999 | Sberveglieri |
| 5,231,359 A | 7/1993 | Masuda et al. | 5,950,514 A | 9/1999 | Benedict et al. |
| 5,231,906 A | 8/1993 | Kogej | 5,963,173 A | 10/1999 | Lian et al. |
| 5,239,978 A | 8/1993 | Plangetis | 5,974,927 A | 11/1999 | Tsune |
| 5,245,879 A | 9/1993 | McKeon | 5,989,116 A | 11/1999 | Johnson et al. |
| 5,257,570 A | 11/1993 | Shiotani et al. | 6,009,782 A | 1/2000 | Tajima et al. |
| 5,265,510 A | 11/1993 | Hoyer-Ellefsen | 6,018,284 A | 1/2000 | Rival et al. |
| 5,272,946 A | 12/1993 | McCullough et al. | 6,037,729 A | 3/2000 | Woods et al. |
| 5,276,431 A | 1/1994 | Piccoli et al. | D422,290 S | 4/2000 | Welsh et al. |
| 5,285,708 A | 2/1994 | Bosten et al. | 6,052,884 A | 4/2000 | Steckler et al. |
| 5,293,802 A | 3/1994 | Shiotani et al. | 6,062,121 A | 5/2000 | Ceroll et al. |
| 5,320,382 A | 6/1994 | Goldstein et al. | 6,070,484 A | 6/2000 | Sakamaki |
| 5,321,230 A | 6/1994 | Shanklin et al. | 6,095,092 A | 8/2000 | Chou |
| 5,331,875 A | 7/1994 | Mayfield | 6,112,785 A | 9/2000 | Yu |
| 5,353,670 A | 10/1994 | Metzger, Jr. | 6,119,984 A | 9/2000 | Devine |

| | | | | | | |
|---|---|---|---|---|---|---|
| 6,131,629 | A | 10/2000 | Puzio et al. | 6,880,440 B2 | 4/2005 | Gass et al. |
| 6,133,818 | A | 10/2000 | Shieh et al. | 6,883,397 B2 | 4/2005 | Kimizuka |
| 6,141,192 | A | 10/2000 | Garzon | 6,889,585 B1 | 5/2005 | Harris et al. |
| 6,148,504 | A | 11/2000 | Schmidt et al. | 6,920,814 B2 | 7/2005 | Gass et al. |
| 6,148,703 | A | 11/2000 | Ceroll et al. | 6,922,153 B2 | 7/2005 | Pierga et al. |
| 6,150,826 | A | 11/2000 | Hokodate et al. | 6,945,148 B2 | 9/2005 | Gass et al. |
| 6,161,459 | A | 12/2000 | Ceroll et al. | 6,945,149 B2 | 9/2005 | Gass et al. |
| 6,170,370 | B1 | 1/2001 | Sommerville | 6,957,601 B2 | 10/2005 | Gass et al. |
| 6,244,149 | B1 | 6/2001 | Ceroll et al. | 6,968,767 B2 | 11/2005 | Yu |
| 6,250,190 | B1 | 6/2001 | Ceroll et al. | 6,986,370 B1 | 1/2006 | Schoene et al. |
| 6,257,061 | B1 | 7/2001 | Nonoyama et al. | 6,994,004 B2 | 2/2006 | Gass et al. |
| 6,283,002 | B1 | 9/2001 | Chiang | 6,997,090 B2 | 2/2006 | Gass et al. |
| 6,295,910 | B1 | 10/2001 | Childs et al. | 7,000,514 B2 | 2/2006 | Gass et al. |
| 6,312,028 | B1 | 11/2001 | Wilkosz | 7,024,975 B2 | 4/2006 | Gass et al. |
| 6,325,195 | B1 | 12/2001 | Doherty | 7,055,417 B1 | 6/2006 | Gass et al. |
| 6,330,848 | B1 | 12/2001 | Nishio et al. | 7,077,039 B2 | 7/2006 | Gass et al. |
| 6,336,273 | B1 | 1/2002 | Nilsson et al. | 7,098,800 B2 | 8/2006 | Gass |
| 6,352,137 | B1 | 3/2002 | Stegall et al. | 7,100,483 B2 | 9/2006 | Gass et al. |
| 6,357,328 | B1 | 3/2002 | Ceroll et al. | 2002/0017175 A1 | 2/2002 | Gass et al. |
| 6,361,092 | B1 | 3/2002 | Eagle et al. | 2002/0017176 A1 | 2/2002 | Gass et al. |
| 6,366,099 | B1 | 4/2002 | Reddi | 2002/0017178 A1 | 2/2002 | Gass et al. |
| 6,376,939 | B1 | 4/2002 | Suzuki et al. | 2002/0017179 A1 | 2/2002 | Gass et al. |
| 6,404,098 | B1 | 6/2002 | Kayama et al. | 2002/0017180 A1 | 2/2002 | Gass et al. |
| 6,405,624 | B2 | 6/2002 | Sutton | 2002/0017181 A1 | 2/2002 | Gass et al. |
| 6,418,829 | B1 | 7/2002 | Pilchowski | 2002/0017182 A1 | 2/2002 | Gass et al. |
| 6,420,814 | B1 | 7/2002 | Bobbio | 2002/0017184 A1 | 2/2002 | Gass et al. |
| 6,427,570 | B1 | 8/2002 | Miller et al. | 2002/0017336 A1 | 2/2002 | Gass et al. |
| 6,430,007 | B1 | 8/2002 | Jabbari | 2002/0020261 A1 | 2/2002 | Gass et al. |
| 6,431,425 | B1 | 8/2002 | Moorman et al. | 2002/0020262 A1 | 2/2002 | Gass et al. |
| 6,450,077 | B1 | 9/2002 | Ceroll et al. | 2002/0020263 A1 | 2/2002 | Gass et al. |
| 6,453,786 | B1 | 9/2002 | Ceroll et al. | 2002/0020271 A1 | 2/2002 | Gass et al. |
| 6,460,442 | B2 | 10/2002 | Talesky et al. | 2002/0043776 A1 | 4/2002 | Chuang |
| 6,471,106 | B1 | 10/2002 | Reining | 2002/0050201 A1 | 5/2002 | Lane et al. |
| 6,479,958 | B1 | 11/2002 | Thompson et al. | 2002/0056349 A1 | 5/2002 | Gass et al. |
| 6,484,614 | B1 | 11/2002 | Huang | 2002/0059853 A1 | 5/2002 | Gass et al. |
| D466,913 | S | 12/2002 | Ceroll et al. | 2002/0059854 A1 | 5/2002 | Gass et al. |
| 6,492,802 | B1 | 12/2002 | Bielski | 2002/0069734 A1 | 6/2002 | Gass et al. |
| D469,354 | S | 1/2003 | Curtsinger | 2002/0088325 A1 | 7/2002 | Talesky et al. |
| 6,502,493 | B1 | 1/2003 | Eccardt et al. | 2002/0096030 A1 | 7/2002 | Wang |
| 6,536,536 | B1 | 3/2003 | Gass et al. | 2002/0096591 A1 | 7/2002 | Tanji |
| 6,543,324 | B2 | 4/2003 | Dils | 2002/0109036 A1 | 8/2002 | Denen et al. |
| 6,546,835 | B2 | 4/2003 | Wang | 2002/0134212 A1 | 9/2002 | Ceroll et al. |
| 6,564,909 | B1 | 5/2003 | Razzano | 2002/0170399 A1 | 11/2002 | Gass et al. |
| 6,575,067 | B2 | 6/2003 | Parks et al. | 2002/0170400 A1 | 11/2002 | Gass |
| 6,578,460 | B2 | 6/2003 | Sartori | 2002/0174755 A1 | 11/2002 | Behne et al. |
| 6,578,856 | B2 | 6/2003 | Kahle | 2002/0190581 A1 | 12/2002 | Gass et al. |
| 6,581,655 | B2 | 6/2003 | Huang | 2003/0000359 A1 | 1/2003 | Eccardt et al. |
| 6,595,096 | B2 | 7/2003 | Ceroll et al. | 2003/0002942 A1 | 1/2003 | Gass et al. |
| D478,917 | S | 8/2003 | Ceroll et al. | 2003/0005588 A1 | 1/2003 | Gass et al. |
| 6,601,493 | B1 | 8/2003 | Crofutt | 2003/0015253 A1 | 1/2003 | Gass et al. |
| 6,607,015 | B1 | 8/2003 | Chen | 2003/0037651 A1 | 2/2003 | Gass et al. |
| D479,538 | S | 9/2003 | Welsh et al. | 2003/0037655 A1 | 2/2003 | Chin-Chin |
| 6,617,720 | B1 | 9/2003 | Egan, III et al. | 2003/0056853 A1 | 3/2003 | Gass et al. |
| 6,619,348 | B2 | 9/2003 | Wang | 2003/0058121 A1 | 3/2003 | Gass et al. |
| 6,640,683 | B2 | 11/2003 | Lee | 2003/0074873 A1 | 4/2003 | Freiberg et al. |
| 6,644,157 | B2 | 11/2003 | Huang | 2003/0089212 A1 | 5/2003 | Parks et al. |
| 6,647,847 | B2 | 11/2003 | Hewitt et al. | 2003/0090224 A1 | 5/2003 | Gass et al. |
| 6,659,233 | B2 | 12/2003 | DeVlieg | 2003/0101857 A1 | 6/2003 | Chuang |
| 6,684,750 | B2 | 2/2004 | Yu | 2003/0109798 A1 | 6/2003 | Kermani |
| 6,722,242 | B2 | 4/2004 | Chuang | 2003/0131703 A1 | 7/2003 | Gass et al. |
| 6,734,581 | B1 | 5/2004 | Griffis | 2003/0140749 A1 | 7/2003 | Gass et al. |
| 6,736,042 | B2 | 5/2004 | Behne et al. | 2003/0213349 A1 | 11/2003 | Chang |
| 6,742,430 | B2 | 6/2004 | Chen | 2004/0011177 A1 | 1/2004 | Huang |
| 6,796,208 | B1 | 9/2004 | Jorgensen | 2004/0040426 A1 | 3/2004 | Gass et al. |
| 6,800,819 | B2 | 10/2004 | Sato et al. | 2004/0060404 A1 | 4/2004 | Metzger, Jr. |
| 6,826,988 | B2 | 12/2004 | Gass et al. | 2004/0104085 A1 | 6/2004 | Lang et al. |
| 6,826,992 | B1 | 12/2004 | Huang | 2004/0159198 A1 | 8/2004 | Peot et al. |
| 6,840,144 | B2 | 1/2005 | Huang | 2004/0194594 A1 | 10/2004 | Dils et al. |
| 6,854,371 | B2 | 2/2005 | Yu | 2004/0200329 A1 | 10/2004 | Sako |
| 6,857,345 | B2 | 2/2005 | Gass et al. | 2004/0226424 A1 | 11/2004 | O'Banion et al. |
| 6,874,397 | B2 | 4/2005 | Chang | 2004/0226800 A1 | 11/2004 | Pierga et al. |
| 6,874,399 | B2 | 4/2005 | Lee | 2004/0255745 A1 | 12/2004 | Peot et al. |
| 6,877,410 | B2 | 4/2005 | Gass et al. | 2005/0057206 A1 | 3/2005 | Uneyama |

| | | | |
|---|---|---|---|
| 2005/0066784 | A1 | 3/2005 | Gass |
| 2005/0092149 | A1 | 5/2005 | Hartmann |
| 2005/0139051 | A1 | 6/2005 | Gass et al. |
| 2005/0139056 | A1 | 6/2005 | Gass et al. |
| 2005/0139057 | A1 | 6/2005 | Gass et al. |
| 2005/0139058 | A1 | 6/2005 | Gass et al. |
| 2005/0139459 | A1 | 6/2005 | Gass et al. |
| 2005/0155473 | A1 | 7/2005 | Gass |
| 2005/0166736 | A1 | 8/2005 | Gass et al. |
| 2005/0178259 | A1 | 8/2005 | Gass et al. |
| 2005/0204885 | A1 | 9/2005 | Gass et al. |
| 2005/0211034 | A1 | 9/2005 | Sasaki et al. |
| 2005/0235793 | A1 | 10/2005 | O'Banion et al. |
| 2005/0274432 | A1 | 12/2005 | Gass et al. |
| 2006/0000337 | A1 | 1/2006 | Gass |
| 2006/0032352 | A1 | 2/2006 | Gass et al. |
| 2006/0123960 | A1 | 6/2006 | Gass et al. |
| 2006/0123964 | A1 | 6/2006 | Gass et al. |
| 2006/0179983 | A1 | 8/2006 | Gass et al. |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |

OTHER PUBLICATIONS

Shop Fox® Fence Operating Manual, Woodstock International, Inc., 1996, revised May 1997.
Gordon Engineering Corp., Product Catalog, pp. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesmeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Tablesaw Splitters and Blade Covers, *Fine Woodworking*, pp. 77-81, Dec. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
Accu-Fence® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Young Inventor: Teen's Device Earns Her Trip to Science Fair, *The Arizona Republic*, May 5, 2006.
Operator Injury Mitigation Using Electronic Sensing and Mechanical Braking and Decoupling Devices in Handheld Circular Saws, Erin F. Eppard, date unknown.
*You Should Have Invented It*, French television show video.
Laguna Tools table saw owner's manual, date unknown.

DETECTION SYSTEM FOR POWER EQUIPMENT

CROSS-REFERENCE TO RELATED APPLICATION

This application is a continuation of U.S. patent application Ser. No. 10/292,607, filed Nov. 12, 2002, issuing as U.S. Pat. No. 7,077,039 on Jul. 18, 2006, which claims the benefit of and priority from U.S. Provisional Patent Application Ser. No. 60/335,970, filed Nov. 13, 2001. Both of the above applications are hereby incorporated by reference in their entireties for all purposes.

TECHNICAL FIELD

The present invention relates to detecting contact between a body part and a sensor and distinguishing such contact from contact between the sensor and other objects.

BACKGROUND

There are many circumstances where it is beneficial to be able to distinguish contact with a human body from contact with other objects or materials. One area where such a capability is especially important is in the guarding of dangerous power equipment. For instance, a system adapted to detect accidental contact between the user of a saw and the saw blade is described in U.S. Provisional Patent Application Ser. No. 60/225,200, filed Aug. 14, 2000 and U.S. patent application Ser. No. 09/929,426, filed Aug. 13, 2001, which are incorporated herein by reference and are assigned to the assignee of the present application. The system of that application relies on the inherent capacitance of the human body to change the voltage on a saw blade carrying a high frequency signal. The system monitors the voltage on the blade, and when it drops suddenly due to contact with a body, the system signals a high speed brake to stop the blade.

While the above-incorporated applications describe various configurations and features which allow the system to distinguish voltage drops caused by contact between the blade and a person from voltage drops caused by other events, additional configurations are possible as describe below.

DETAILED DESCRIPTION

Figure 1:
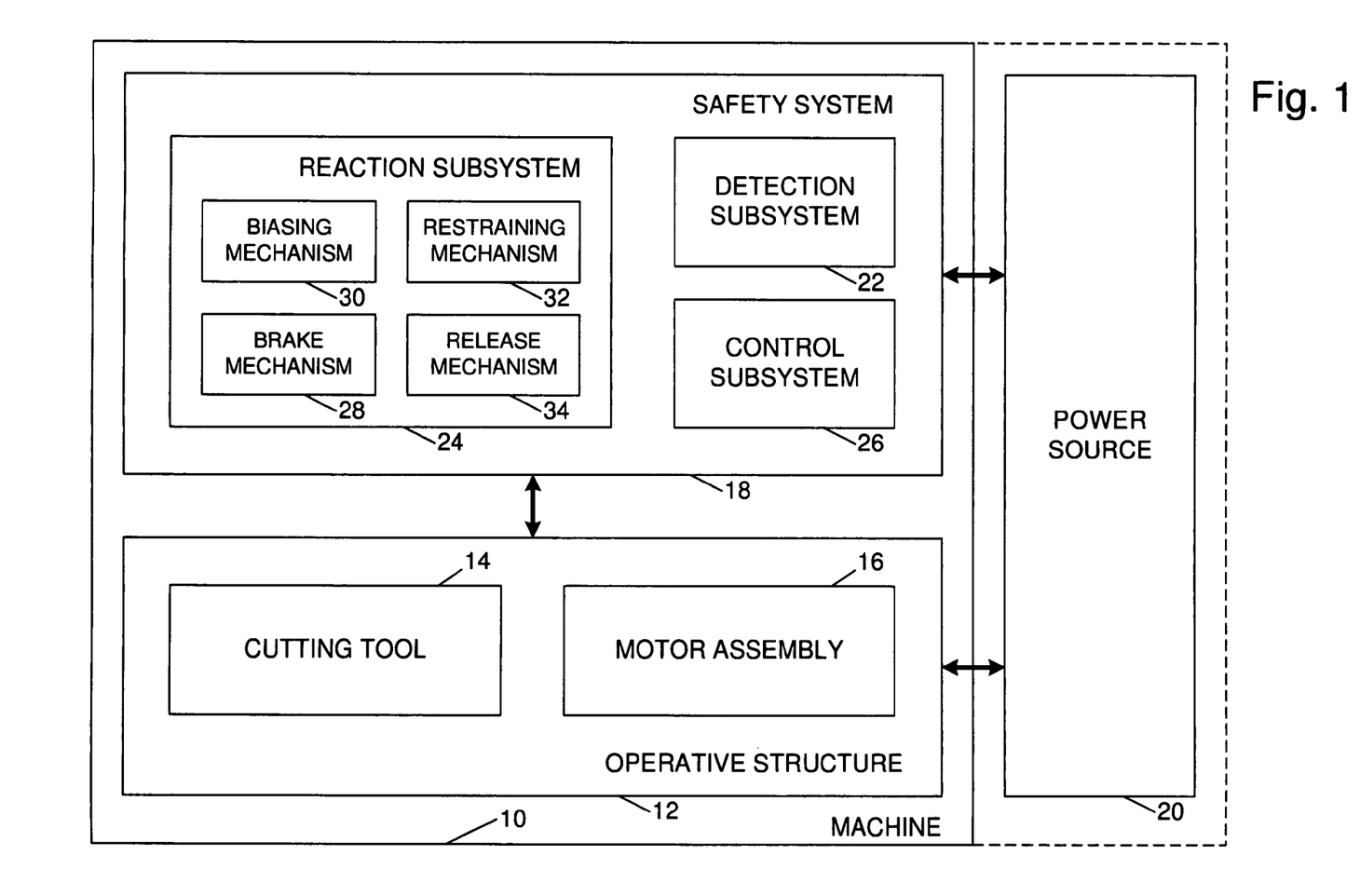
FIG. 1 is a schematic block diagram of a machine with a fast-acting safety system according to the present invention.

A machine according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000 and U.S. patent application Ser. No. 09/676,190, filed Sep. 29, 2000, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000 and U.S. patent application Ser. No. 09/929,226, filed Aug. 13, 2001, the disclosures of which are herein incorporated by reference. Retraction of the cutting tool from its operating position is described in more detail in U.S. Provisional Patent Application Ser. No. 60/225,089, filed Aug. 14, 2000 and U.S. patent application Ser. No. 09/929,242, filed Aug. 13, 2001, the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
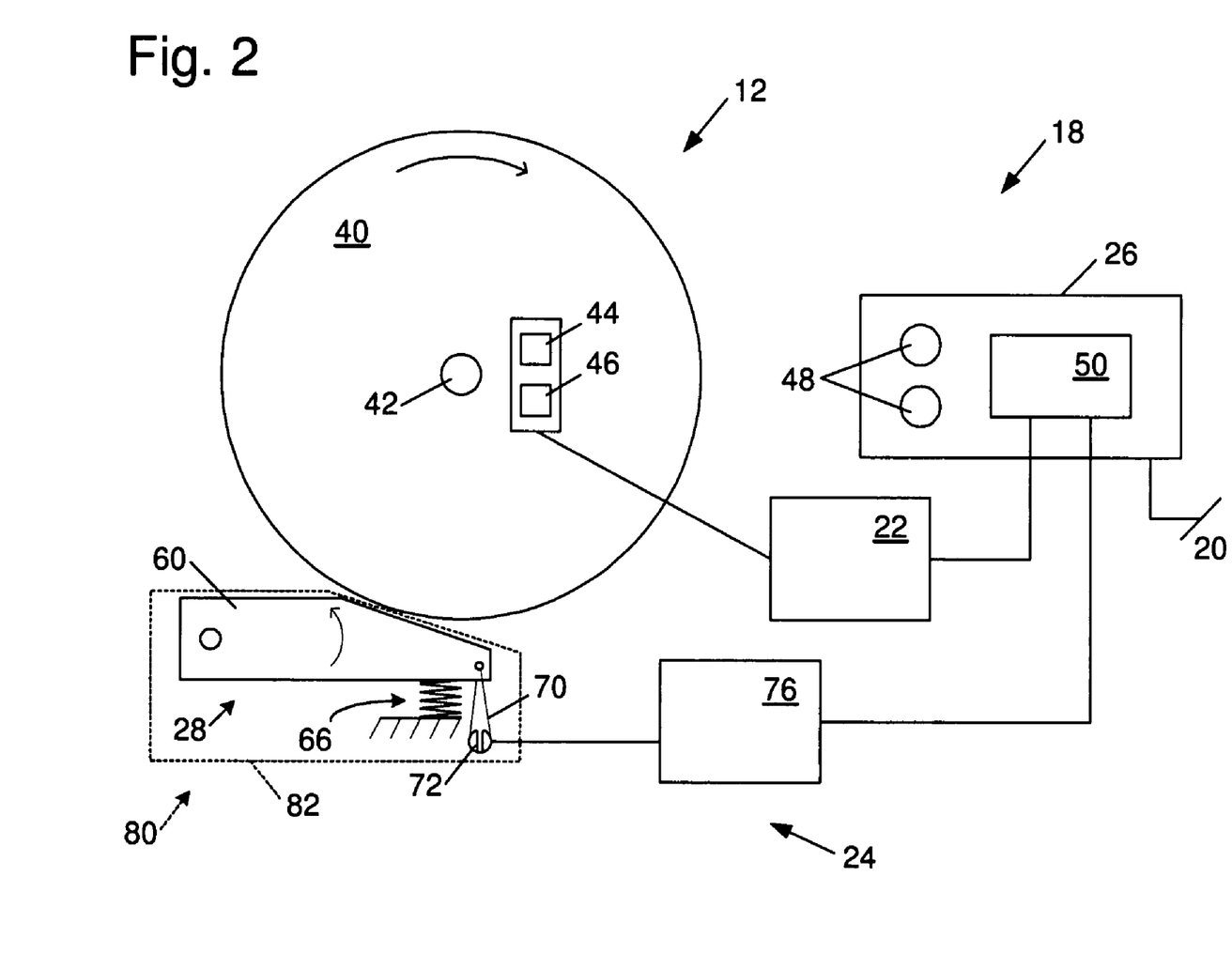
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, brake mechanism 28 is adapted to engage the teeth of blade 40 and stop the rotation of the blade. U.S. Provisional Patent Application Ser. No. 60/225,210, filed Aug. 14, 2000 and U.S. patent application Ser. No. 09/929,425, filed Aug. 13, 2001, the disclosures of which are herein, incorporated by reference, describe other systems for stopping the movement of the cutting tool. U.S. Provisional Patent Application Ser. No. 60/225,057, filed Aug. 14, 2000 U.S. patent application Ser. No. 09/929,238, filed Aug. 13, 2001, U.S. Provisional Patent Application Ser. No. 60/225,058, filed Aug. 14, 2000, and U.S. patent application Ser. No. 09/929,235, filed Aug. 13, 2001, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14, is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in U.S. Provisional Patent Application Ser. No. 60/225,200, filed Aug. 14, 2000, U.S. patent application Ser. No. 09/929,426, filed Aug. 13, 2001, U.S. Provisional Patent Application Ser. No. 60/225,211, filed Aug. 14, 2000, U.S. patent application Ser. No. 09/929,221, filed Aug. 13, 2001, U.S. Provisional Patent Application Ser. No. 60/270,011, filed Feb. 20, 2001, U.S. Provisional Patent Application Ser. No. 60/298,207, filed Jun. 13, 2001, and U.S. Provisional Patent Application Ser. No. 60/302,937, filed Jul. 2, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, U.S. patent application Ser. No. 09/929,237, filed Aug. 13, 2001, U.S. Provisional Patent Application Ser. No. 60/225,094, filed Aug. 14, 2000, and U.S. patent application Ser. No. 09/929,234, filed Aug. 13, 2001, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. patent application Ser. No. 09/929,240, filed Aug. 13, 2001, U.S. Provisional Patent Application Ser. No. 60/225,169, filed Aug. 14, 2000, U.S. patent application Ser. No. 09/929,241, filed Aug. 13, 2001, U.S. Provisional Patent Application Ser. No. 60/225,170, filed Aug. 14, 2000, and U.S. patent application Ser. No. 09/929,227, filed Aug. 13, 2001, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, U.S. patent application Ser. No. 09/929,236, filed Aug. 13, 2001, U.S. Provisional Patent Application Ser. No. 60/225,212, filed Aug. 14, 2000, and U.S. patent application Ser. No. 09/929,244, filed Aug. 13, 2001, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. No. 60/157,340, filed Oct. 1, 1999, U.S. Provisional Patent Application Ser. No. 60/182,866, filed Feb. 16, 2000, and U.S. patent application Ser. No. 09/676,190, filed Sep. 29, 2000, the disclosures of which are herein incorporated by reference.

Figure 3:
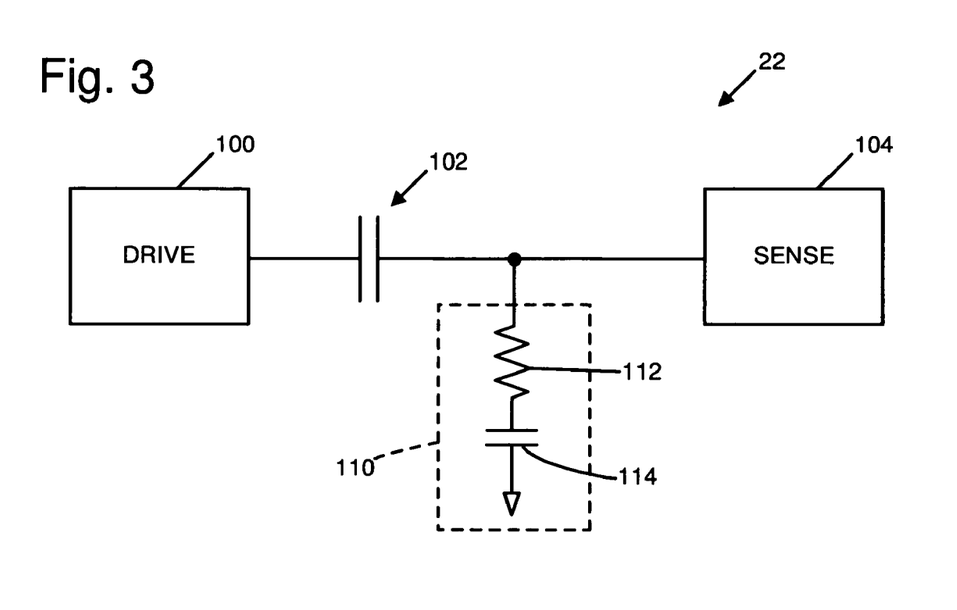
FIG. 3 is an equivalent circuit model that generally characterizes the electrical system formed by an exemplary detection subsystem and blade when the blade is in contact with a human body.
Figure 4:
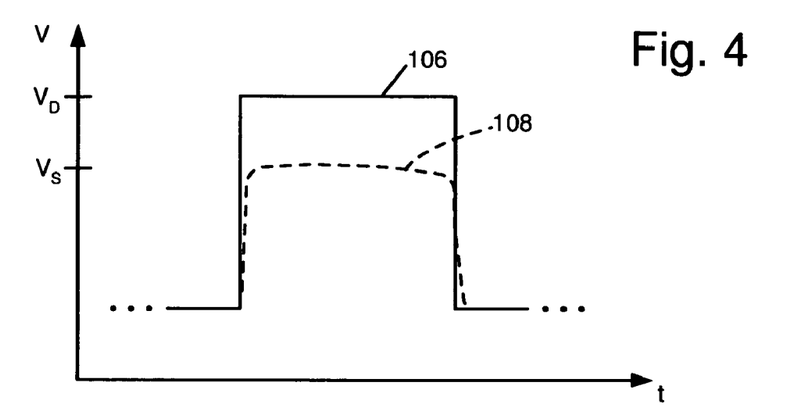
FIG. 4 is a graph schematically illustrating exemplary drive and sensed signals according to the present invention.

Considering detection subsystem 22 in more detail, the references incorporated above describe a variety of different exemplary detection subsystems adapted to detect contact between a person and blade 40. For example, several detection subsystems described in U.S. Provisional Patent Application Ser. No. 60/225,200, filed Aug. 14, 2000, and U.S. patent application Ser. No. 09/929,426, filed Aug. 13, 2001 are configured to detect any change in the apparent electrical capacitance of the blade. FIG. 3 schematically illustrates the basic electrical circuit equivalent of a typical detection subsystem 22 and saw blade. The detection subsystem includes a drive portion 100 coupled to the blade (represented by capacitor 102). Drive portion 100 is configured to couple a drive signal onto the blade. A sense portion 104 of the detection system is also coupled to the blade to monitor the signal on the blade. As shown in FIG. 4, the drive signal (represented by solid line 106) typically has a voltage amplitude that varies with time such as a sine wave, square wave, delta function, pulse, etc. The sensed signal coupled to the blade (represented by dash line 108) essentially mirrors the drive signal except that the amplitude of the sensed signal $V_S$ is less than the amplitude of the drive signal $V_D$. In addition, any resistance in the cabling between the drive/sense portions and the blade may cause a small charge/discharge delay on the blade. However, it will be appreciated by those of skill in the art that the resistance, if any, will typically be in the milli-ohm range so that the RC-time constant of the cabling/blade assembly will be on the order of a few picoseconds or less. (It should be noted that in FIGS. 4-8, sensed signal 108 is shown with a greatly exaggerated charge/discharge delay due to the RC-time constant of the cabling/blade assembly.)

When a person contacts the blade, the impedance of the person's body, indicated at 110 in FIG. 3, is coupled to the blade. The human body impedance can be modeled by a resistor 112 in series with a capacitor 114. Thus, a portion of the charge on blade 102 is transferred through resistor 112 to capacitor 114, thereby decreasing the amplitude of the sensed voltage $V_S$ to a lower level as indicated at $V_{SC}$ in FIG. 5. The exemplary detection subsystem described in the above-identified references detects this decrease in the sensed voltage amplitude and sends a signal to the control subsystem which triggers the reaction subsystem. It will be appreciated that the RC-time constant of resistor 112 and capacitor 114 will determine how fast a portion of the charge on capacitor 102 is transferred to capacitor 114. Typical values for the human body capacitance are 50-300 pF, while typical values for the human body resistance are approximately 1 k-ohm. As a result typical values for the RC-time constant of resistor 112 and capacitor 114 will be 50-300 nanoseconds. As described in the references incorporated above, the drive signal typically has a frequency of approximately 100-500 kHz, giving a signal period of 2-10 μsec. Thus, the RC-time constant of a person's body is substantially invisible to the exemplary detection subsystems described in the above-incorporated references.

Figure 5:
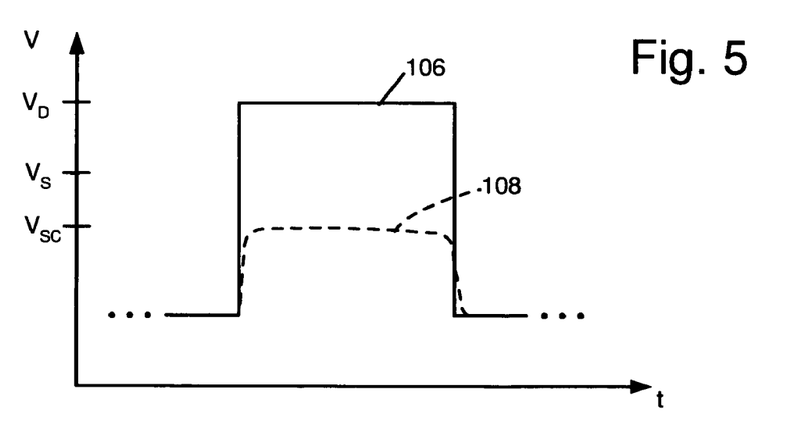
FIG. 5 is similar to FIG. 4 but shows the sensed signal reduced in amplitude due to increase apparent capacitance of the blade.

As also described in the above-identified references, other materials may cause a change in the sensed signal when placed in contact with the blade. For example, when very green wood is being cut by the blade, the relatively high dielectric constant of the wood may also cause the apparent capacitance of the blade to increase as the air dielectric around the blade is replace by green wood dielectric. In other words, the capacitance of capacitor 102 in FIG. 3 is increased, thereby reducing the amplitude of sensed voltage $V_S$ for a given drive voltage $V_D$. In some instances, the sensed voltage $V_S$ may be decreased to the level $V_{SC}$ as shown in FIG. 5, thereby causing control subsystem 26 to trigger reaction subsystem 24. The change in apparent blade-capacitance experienced when cutting green wood accumulates (i.e., increases to a maximum amount) over tens, hundreds or even thousands of milliseconds as more and more of the green wood is moved into contact with the blade. However, the RC-time constant of the cabling/blade assembly will remain very low.

In view of the effect of high-dielectric materials such as green wood on the sensed voltage $V_S$, some of the exemplary embodiments of detection subsystem 22 described in the above-mentioned references are configured to distinguish contact between the blade and a person from contact between the blade and green wood to prevent erroneously triggering the reaction subsystem when cutting green wood. These detection subsystems typically identify contact between a person and the blade based on a predetermined decrease in the sensed voltage which occurs over several microseconds ($V_D$ has a frequency of a few hundred kHz). As discussed above, this time frame is much larger than the RC-time constant associated with the human body impedance. Therefore, the person's body is fully charged and discharged during a small fraction of each cycle of the signal. In contrast, the change in apparent blade-capacitance due to contact with green wood changes only slightly over a time frame of several microseconds. Therefore, while cutting green wood can ultimately cause a comparable decrease in the amplitude of sensed voltage $V_S$, the decrease occurs over many cycles of the signal. In other words, these detection subsystems distinguish a human body from green wood based on the rate at which the apparent capacitance of the blade changes. If the apparent capacitance of the blade decreases to a predetermined threshold within several microseconds or tens of microseconds, then detection subsystem 22 recognizes the decrease as a human body contact. However, if the apparent capacitance of the blade decreases to the predetermined threshold within several hundred or thousand microseconds, then detection subsystem 22 does not recognize the decrease as a human body contact.

Alternatively, detection subsystem 22 may be configured in any of a variety of other ways to distinguish contact between the blade and a person from contact with high-dielectric materials such as green wood. For example, the detection subsystem may be configured to detect the charging and/or discharging of the person's body (i.e., capacitor 102) that occurs separately from charging and discharging of the blade. Since green wood merely increases the capacitance of the blade rather than adding an additional capacitor to the detection circuit, no separate charging or discharging occurs when green wood contacts the blade. In other words, detection subsystem 22 may be configured to a change in the apparent capacitance of the blade, but also a change in the apparent frequency response of the blade.

Thus, in one exemplary embodiment of detection subsystem 22, drive portion 100 is configured to drive a signal onto the blade having a frequency and/or shape adapted to output a signal to sense portion 104 that indicates the charging and/or discharging of the person's body. For example, drive signal $V_D$ may be a signal having a period comparable to the RC-time constant of the human body impedance. It will be appreciated that the drive signal may be any type of alternating signal such as a sine wave, square wave, delta signal, etc., or may be repeating pulses (either periodic or non-periodic) having rise and/or fall times much shorter than the RC-time constant of the human body impedance. Additionally, the frequency of the drive signal may be varied, stepped or swept over a range of frequencies to emphasize the charge/discharge delay that is coupled to the blade when a human body is placed into contact with the blade. The detection subsystem may be configured to analyze the sensed signal at each frequency to distinguish human body contact from contact with a high-dielectric material. Alternatively, the drive signal may have several frequency components (e.g., a 50 MHz component, a 10 MHz component, a 1 MHz component, and a 500 kHz component). In such case, the detection subsystem may be configured to filter or otherwise separate out each component from the sensed signal to determine the frequency response of the blade circuit. Optionally, multiple sense portions 104 may be employed to analyze and/or sense each frequency component.

Figure 6:
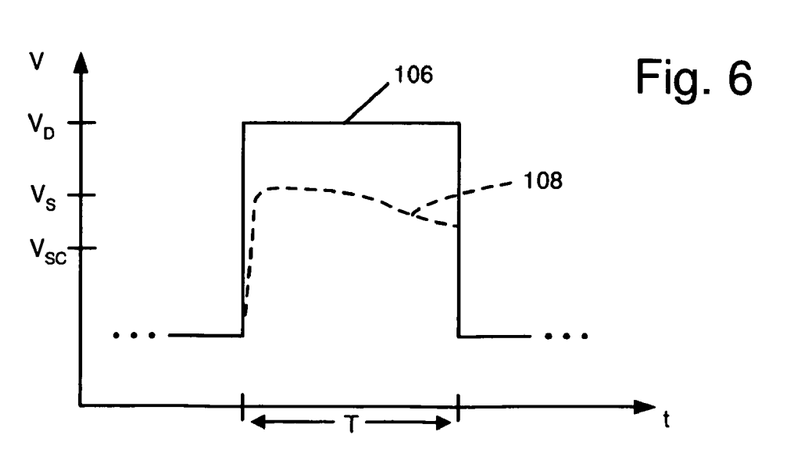
FIG. 6 is a graph schematically illustrating an alternative drive signal having a period substantially equivalent to the RC-time constant of a human body, and showing the corresponding sensed signal when the human body is coupled to the blade.

FIG. 6 illustrates an exemplary drive signal 106 including a pulse width (T) on the order of approximately one RC-time constant of the human body impedance. When the blade is in contact with a person's body, sensed signal 108 initially rises to a level $V_S$ corresponding to the capacitance of the blade alone. However, as a portion of the charge on the blade discharges into the person's body, the sensed signal decreases toward $V_{SC}$ corresponding to the apparent capacitance of the blade when coupled to the person's body. In contrast, the voltage of sensed signal 108 does not vary during the period T when the blade contacts a high-dielectric material because: 1) the RC-time constant of the cabling/blade assembly is much less than T; and 2) there is no secondary RC circuit to charge.

Figure 7:
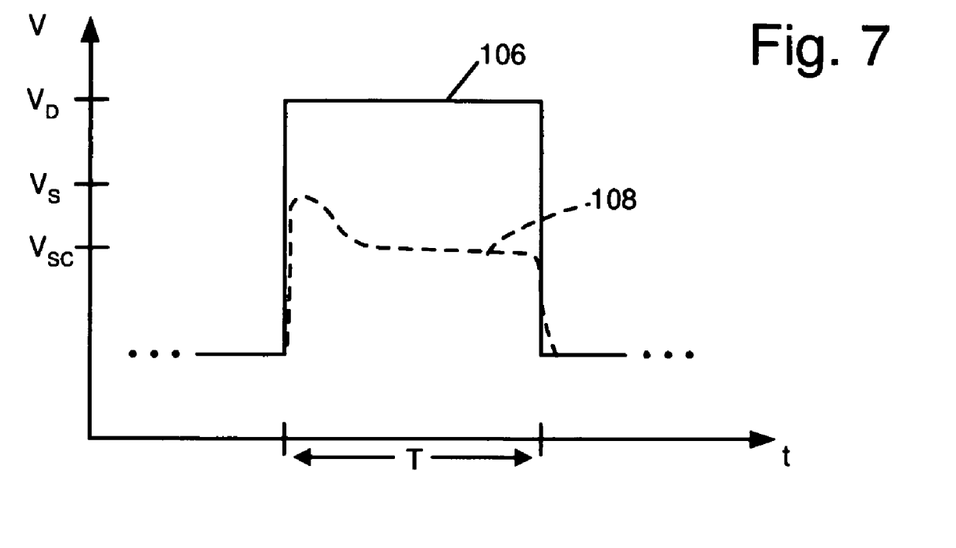
FIG. 7 is a graph schematically illustrating an alternative drive signal having a period equal to approximately five RC-time constants of a human body, and showing the corresponding sensed signal when the human body is coupled to the blade.
Figure 8:
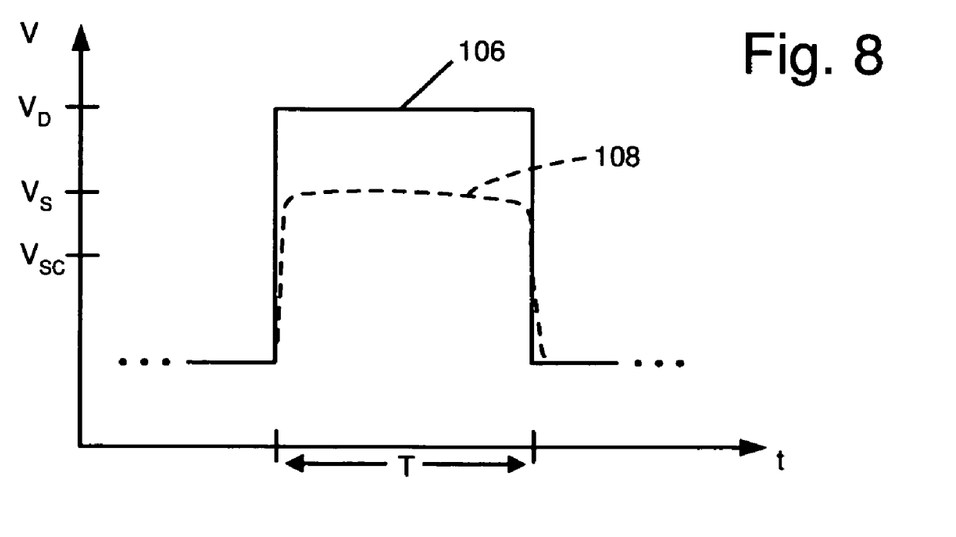
FIG. 8 is a graph schematically illustrating an alternative drive signal having a period equal to approximately $1/10^{th}$ of an RC-time constant of a human body, and showing the corresponding sensed signal when the human body is coupled to the blade.

Similarly, FIG. 7 illustrates an exemplary drive signal 106 including a pulse width (T) on the order of approximately five RC-time constants of the human body impedance. When the blade is in contact with a person's body, sensed signal 108 initially rises to $V_S$, and then decreases to $V_{SC}$ well within period T. In FIG. 8, drive signal 106 has a pulse width on the order of $\frac{1}{10}^{th}$ of the RC-time constant of the human body impedance. Consequently, sensed signal 108 does not discharge toward $V_{SC}$ during time period T even when a person's body is in contact with the blade.

It will be appreciated by those of skill in the art that detection subsystem 22 may be configured in any of a variety of ways to distinguish contact between a blade and a person from contact with other materials based on changes in the apparent frequency response of the blade. For example, the drive signal may be configured with multiple frequencies, one or more having periods approximately equal to or greater than the RC-time constant of a person's body, and one or more frequencies having periods approximately equal to or less than the RC-time constant of a person's body. In such case, a drop in the sensed signal voltage level at low frequencies but not at high frequencies may indicate contact with a human body rather than other materials. Alternatively or additionally, the detection subsystem may be configured to utilize a drive signal with a single frequency (or rise/fall time) comparable to the maximum frequency response of the blade when contacted by a human body. In which case, a decrease in the voltage level of the sensed signal from an initially high level during the period of the pulse (e.g., as shown in FIGS. 6 and 7) may indicate contact with a human body rather than other materials. It will be understood that while the examples used herein employ positive voltage pulses, the detection subsystem may additionally or alternatively be configured to employ negative voltage pulses to detect contact.

The exemplary detection subsystem described above may also be used to distinguish contact between the blade and a person from contact with conductive materials such as aluminum which may electrically ground the blade to other portions of machine 10. Thus a sensed signal having a zero voltage would not indicate contact between the blade and a person. Since the detection subsystem may be unable to detect contact between the blade and a person when the blade is grounded, it may be desirable to configure control subsystem 26 to turn off power to machine 10 if the sense signal is grounded (unless a bypass control is provided as described in the above-incorporated references).

It will be appreciated that the frequency characteristics of the drive signal employed by detection subsystem 22 to distinguish contact between the blade and a person from contact between the blade and other materials may vary depending on the type of other materials likely to come into contact with the blade. For example, wood products including green, wet and/or pressure treated materials are typically the workpiece materials most likely to come into contact with the cutting tools of woodworking machines. Alternatively, many similar machines are used for cutting other building or manufacturing materials (e.g., plastics, foams, ceramics, etc.), food products (e.g., meats, etc.), textiles, paper, etc. Therefore, depending on the particular application, it may be desirable to analyze the frequency response of the workpiece materials (or other materials) likely to contact the blade relative to the frequency response of the human body to determine the optimal frequency parameters for use by the detection subsystem.

Figure 9:
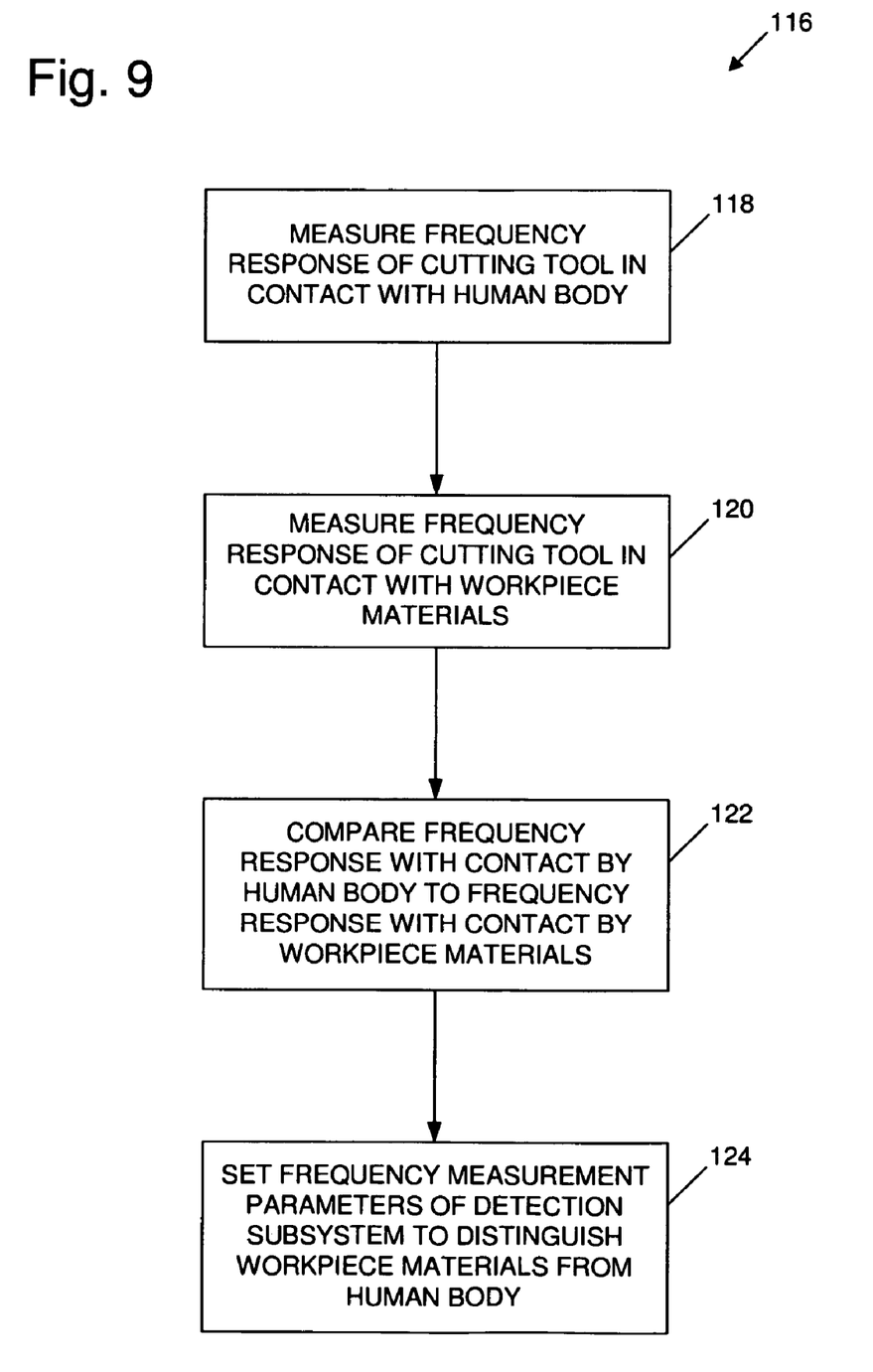
FIG. 9 is a flowchart illustrating an exemplary method for configuring a detection subsystem to distinguish contact between a cutting tool and a person from contact between a cutting tool and other materials.
Figure 10:
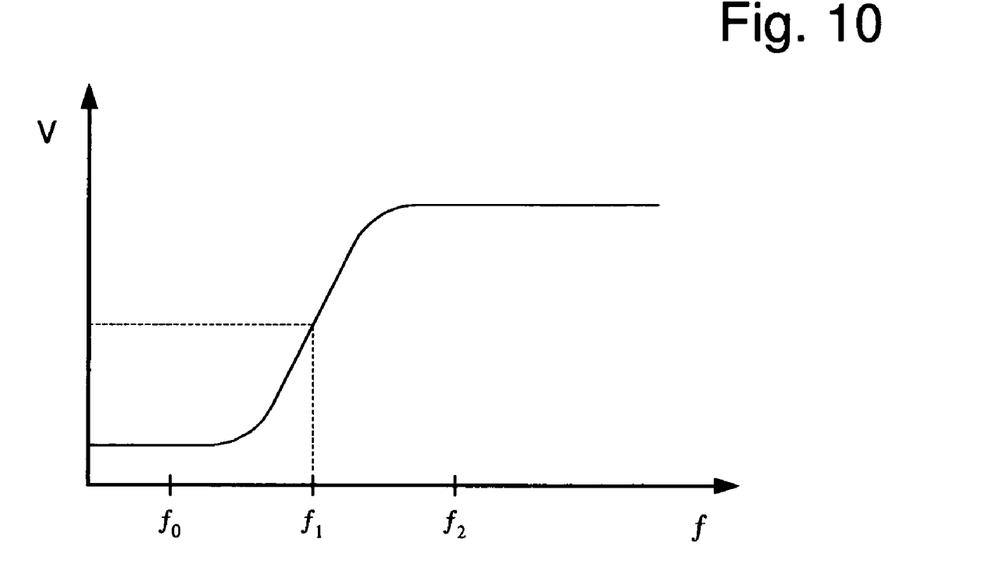
FIG. 10 is a graph showing an exemplary frequency response graph corresponding to the sensed signal from an exemplary cutting tool in contact with a person.
Figure 11:
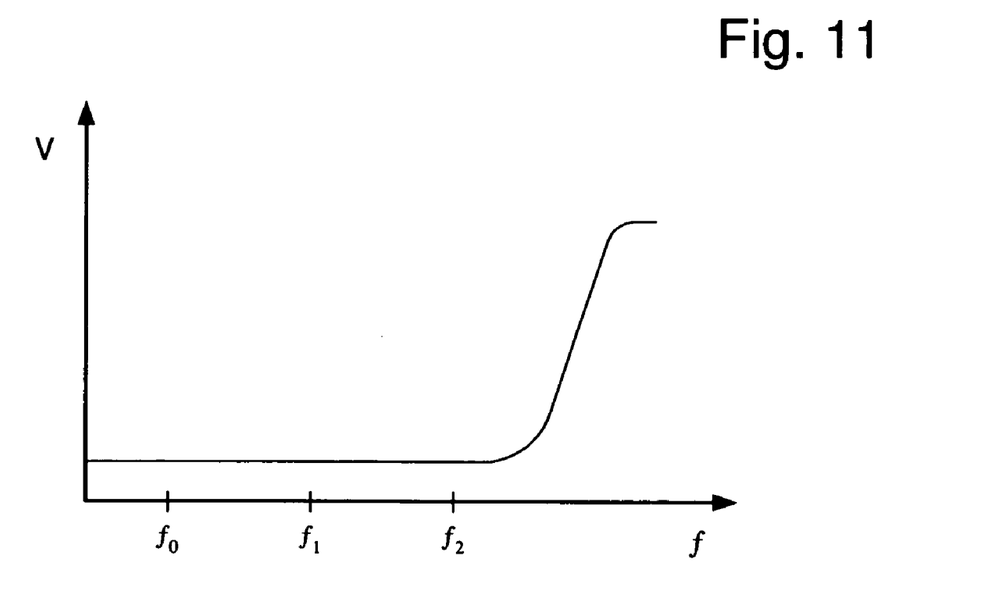
FIG. 11 is a graph showing an exemplary frequency response corresponding to the sensed signal from an exemplary cutting tool in contact with a material other than a person.

An exemplary method for conducting such an analysis is illustrated in FIG. 9 and indicated generally at 116. The method includes measuring the frequency response of the cutting tool when in contact with a person, as indicated at 118, and measuring the frequency response of the cutting tool in contact with one or more other materials, as indicated at 120. For example, FIG. 10 illustrates a sample frequency response graph corresponding to an exemplary cutting tool in contact with a person, while FIG. 11 illustrates a sample frequency response graph corresponding to the same cutting tool in contact with another material. Method 116 continues with comparing the measured frequency responses to determine one or more optimal frequencies at which to detect contact, as indicated at 122. Detection subsystem 22 may then be configured to sense for contact between the blade and a person at the determined frequencies, indicated at 124. For example, in the exemplary embodiments illustrated in FIGS. 10 and 11, detection system 22 might be configured to sense for contact at one or more frequencies from $f_1$ to $f_2$, as well at $f_0$ or less. In such case, attenuation of the sensed signal at $f_0$ but not at $f_2$ would indicate contact between the blade and a person rather contact between the blade and a material having the frequency response shown in FIG. 11.

Figure 12:
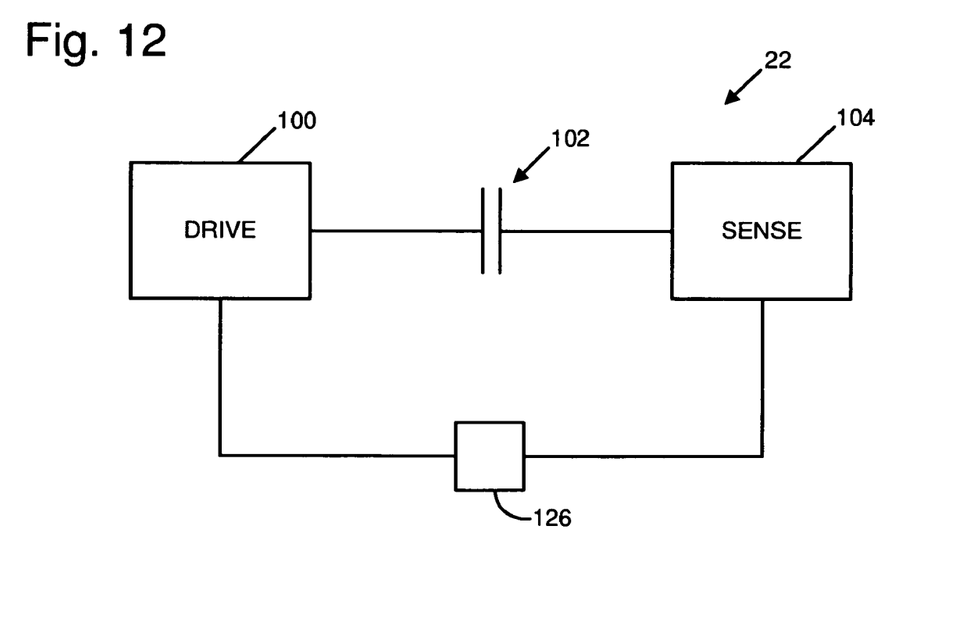
FIG. 12 is an equivalent circuit model that generally characterizes the electrical system formed by a blade and an alternative exemplary detection subsystem having a test electrode.

In an alternative embodiment, detection subsystem 22 may be configured to automatically "tune" to the frequency response of a particular person. For example, FIG. 12 illustrates an exemplary detection subsystem which includes a test electrode 126 connected to both drive portion 100 and sense portion 104. When a person's body is placed into contact with test electrode 126, the drive signal charges and discharges the person's body. The detection subsystem analyzes the sensed signal to determine the RC-time constant of the person's body. The detection subsystem then adjusts the frequency characteristics of the drive signal correspondingly so that only materials having a substantially similar frequency response will be detected as a dangerous condition (i.e., contact between the blade and a person). The test electrode may be a separate, dedicated structure or may be built into any suitable portion of machine 10 which a user typically touches such as control buttons, knobs, handles, cranks, fences, etc. Control subsystem 26 may be configured to require a user to contact test electrode 126 prior to enabling operation of machine 10.

As described herein, safety system 18 includes a detection subsystem adapted to detect contact between a person and the cutting tools of various types of woodworking machines. The detection subsystem is adapted to detect when contact occurs between the cutting tool and a human body, while distinguishing contact between the cutting tool and other materials which may change the electrical characteristics of the cutting tool. While several exemplary embodiments of safety system 18 and detection subsystem 22 are described above, the particular embodiments that have been described serve to illustrate that many different modifications and alterations are possible within the scope of the invention. The particular electrical implementation of detection subsystem 22 may utilize any of a variety of different electronic components and configurations which are known to those of skill in the art.

It will be appreciated that safety system 18 and detection subsystem 22 may be adapted for use on a variety of different woodworking machines. Several examples of such woodworking machines, as well as further detailed descriptions of alternative safety systems may be found in the references incorporated above, as well as in the following references, the disclosures of which are herein incorporated by reference: PCT Patent Application Serial No. PCT/US00/26812, filed Sep. 29, 2000; U.S. patent application Ser. No. 09/955,418, filed Sep. 17, 2001; U.S. patent application Ser. No. 09/929,221, filed Aug. 13, 2001; U.S. patent application Ser. No. 09/929,226, filed Aug. 13, 2001; U.S. patent application Ser. No. 09/929,227, filed Aug. 13, 2001; U.S. patent application Ser. No. 09/929,234, filed Aug. 13, 2001; U.S. patent application Ser. No. 09/929,235, filed Aug. 13, 2001; U.S. patent application Ser. No. 09/929,236, filed Aug. 13, 2001; U.S. patent application Ser. No. 09/929,237, filed Aug. 13, 2001; U.S. patent application Ser. No. 09/929,238, filed Aug. 13, 2001; U.S. patent application Ser. No. 09/929,240, filed Aug. 13, 2001; U.S. patent application Ser. No. 09/929,241, filed Aug. 13, 2001; U.S. patent application Ser. No. 09/929,242, filed Aug. 13, 2001; U.S. patent application Ser. No. 09/929,244, filed Aug. 13, 2001; U.S. patent application Ser. No. 09/929,425, filed Aug. 13, 2001; U.S. patent application Ser. No. 09/929,426, filed Aug. 13, 2001; U.S. patent application Ser. No. 09/676,190, filed Sep. 29, 2000; U.S. Provisional Patent Application Ser. No. 60/312,141, filed Aug. 13, 2001; U.S. Provisional Patent Application Ser. No. 60/324,729, filed Sep. 24, 2001; U.S. Provisional Patent Application Ser. No. 60/323,975, filed Sep. 21, 2001; U.S. Provisional Patent Application Ser. No. 60/308,492, filed Jul. 27, 2001; U.S. Provisional Patent Application Ser. No. 60/307,756, filed Jul. 25, 2001; U.S. Provisional Patent Application Ser. No. 60/306,202, filed Jul. 18, 2001; U.S. Provisional Patent Application Ser. No. 60/302,916, filed Jul. 3, 2001; U.S. Provisional Patent Application Ser. No. 60/292,100, filed May 17, 2001; U.S. Provisional Patent Application Ser. No. 60/292,081, filed May 17, 2001; U.S. Provisional Patent Application Ser. No. 60/279,313, filed Mar. 27, 2001; U.S. Provisional Patent Application Ser. No. 60/275,595, filed Mar. 13, 2001; U.S. Provisional Patent Application Ser. No. 60/275,594, filed Mar. 13, 2001; U.S. Provisional Patent Application Ser. No. 60/273,902, filed Mar. 6, 2001; U.S. Provisional Patent Application Ser. No. 60/273,178, filed Mar. 2, 2001; U.S. Provisional Patent Application Ser. No. 60/273,177, filed Mar. 2, 2001; U.S. Provisional Patent Application Ser. No. 60/270,942, filed Feb. 22, 2001; U.S. Provisional Patent Application Ser. No. 60/270,941, filed Feb. 22, 2001; U.S. Provisional Patent Application Ser. No. 60/233,459, filed Sep. 18, 2000; U.S. Provisional Patent Application Ser. No. 60/225,210, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; U.S. Provisional Patent application Ser. No. 60/182,866, filed Feb. 16, 2000; U.S. Provisional Patent Application Ser. No. 60/157,340, filed Oct. 1, 1999; and U.S. Pat. No. 4,267,914, issued May 19, 1981 to Saar.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. For use with a woodworking machine having an operative portion configured to work by contacting items, a method of detecting contact between the operative portion and a portion of a human body, the method comprising:
  imparting an electrical signal including multiple frequency components onto the operative portion of the machine;
  monitoring the frequency response of the electrical signal by detecting changes in the electrical signal as a function of frequency when the operative portion contacts items; and
  if the operative portion of the machine contacts an item that causes the frequency response of the electrical signal to have predetermined characteristics at multiple frequency components indicative of contact between the operative portion and the portion of a human body, then designating the contact as contact with the portion of a human body.

2. The method of claim 1, where the electrical signal is a square wave.

3. The method of claim 1, where the electrical signal is a sine wave.

4. The method of claim 1, where the electrical signal has a period comparable to the RC-time constant of a human body.

5. The method of claim 1, where the electrical signal includes a pulse width greater than one RC-time constant of a human body.

6. The method of claim 1, where the electrical signal includes a pulse width greater than two RC-time constants of a human body.

7. The method of claim 1, where the electrical signal includes a pulse width less than one RC-time constant of a human body.

8. The method of claim 1, where at least one frequency component has periods greater than the RC-time constant of a human body end at least one frequency component has periods less than the RC-time constant of a human body.

9. The method of claim 1, where the electrical signal is swept through a range of frequencies.

10. The method of claim 1, where the electrical signal varies over a range of frequencies.

11. The method of claim 1, where the woodworking machine is a table saw.

12. The method of claim 1, where the operative portion is a circular blade.

13. The method of claim 1, further comprising reacting to the contact designated as contact with the portion of a human body by performing a predetermined action to mitigate possible injury.

14. The method of claim 1, where the method is employed to mitigate injury from contact between the portion of a human body and the operative portion.

15. A method of triggering an action to protect a user of a woodworking machine from accidental contact with a specified portion of the machine, the method comprising:
  imparting an electrical signal onto the specified portion of the machine, where the electrical signal includes multiple frequencies components;
  monitoring the frequency response of the electrical signal by detecting changes in one or more characteristics of the electrical signal as a function of frequency; and
  triggering the action when the frequency response indicates an unsafe condition between a human body and the specified portion of the machine.

16. The method of claim 15, where the woodworking machine includes a cutting tool and the action is to retract the cutting tool.

17. The method of claim 15, where the woodworking machine includes a moving cutting tool and the action is to decelerate the cutting tool.

18. The method of claim 15, where the specified portion is a cutting tool and where the unsafe condition is contact with the cutting tool.

19. The method of claim 15, where the specified portion is a cutting tool and where the unsafe condition is proximity to the cutting tool.

20. For use with a woodworking machine having an operative portion configured to work by contacting items, a method of mitigating an unsafe condition between the operative portion and a portion of a human body, the method comprising:

imparting an electrical signal including multiple frequency components onto the operative portion of the machine;

monitoring the frequency response of the electrical signal by detecting changes in the electrical signal as a function of frequency when the operative portion is working; and if the frequency response of the electrical signal has predetermined characteristics at multiple frequency components indicative of an unsafe condition between the operative portion and the portion of a human body, then triggering an action to mitigate the unsafe condition.

\* \* \* \* \*